March 14, 1967  C. D. GOODMAN  3,309,524
HYDROGEN DETECTOR USING HYDROGEN PERMEABLE
MEMBRANE WITH FEEDBACKS
Filed March 18, 1963  5 Sheets-Sheet 1
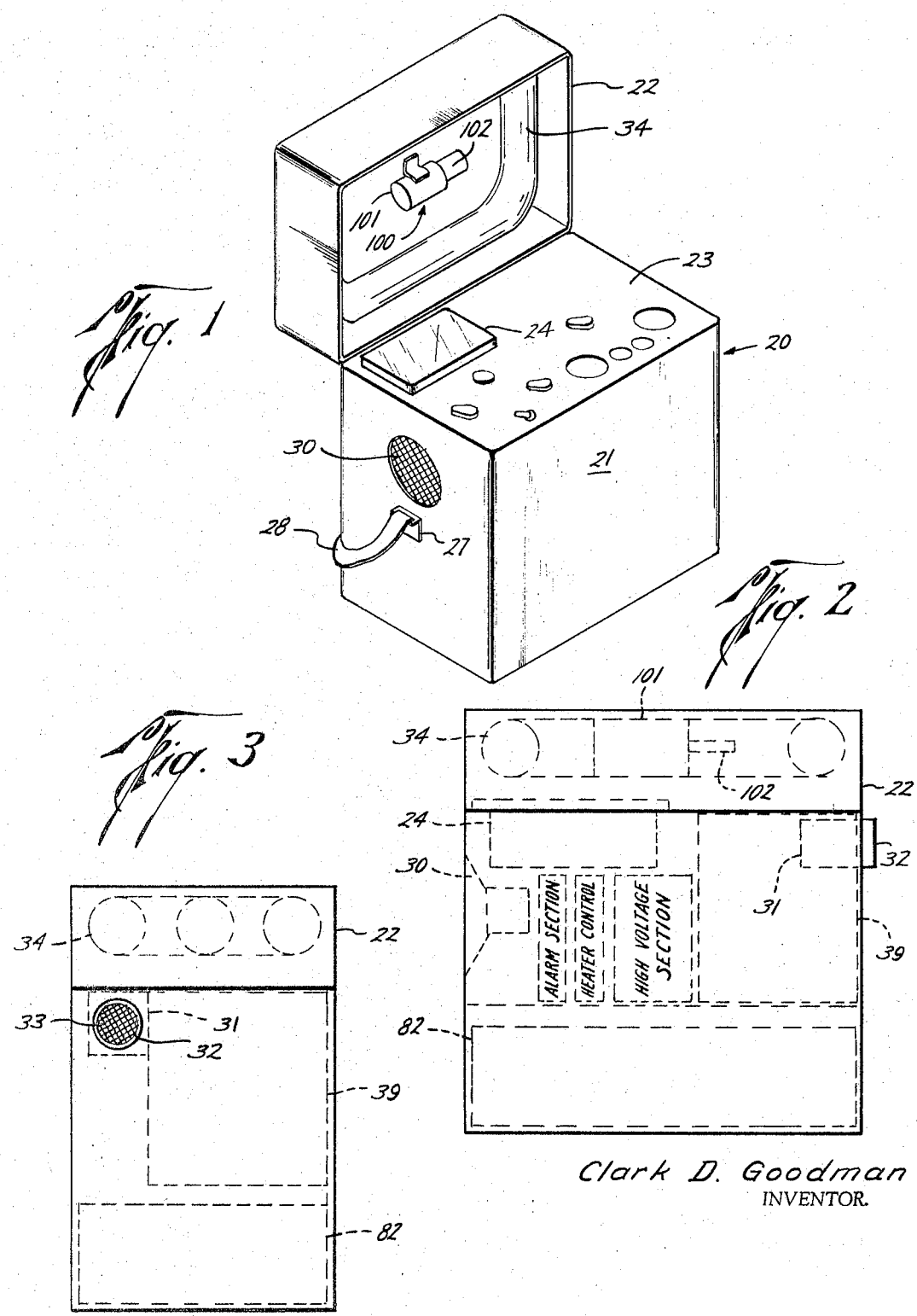
Clark D. Goodman
INVENTOR.

Clark D. Goodman
INVENTOR.

Clark D. Goodman
INVENTOR.

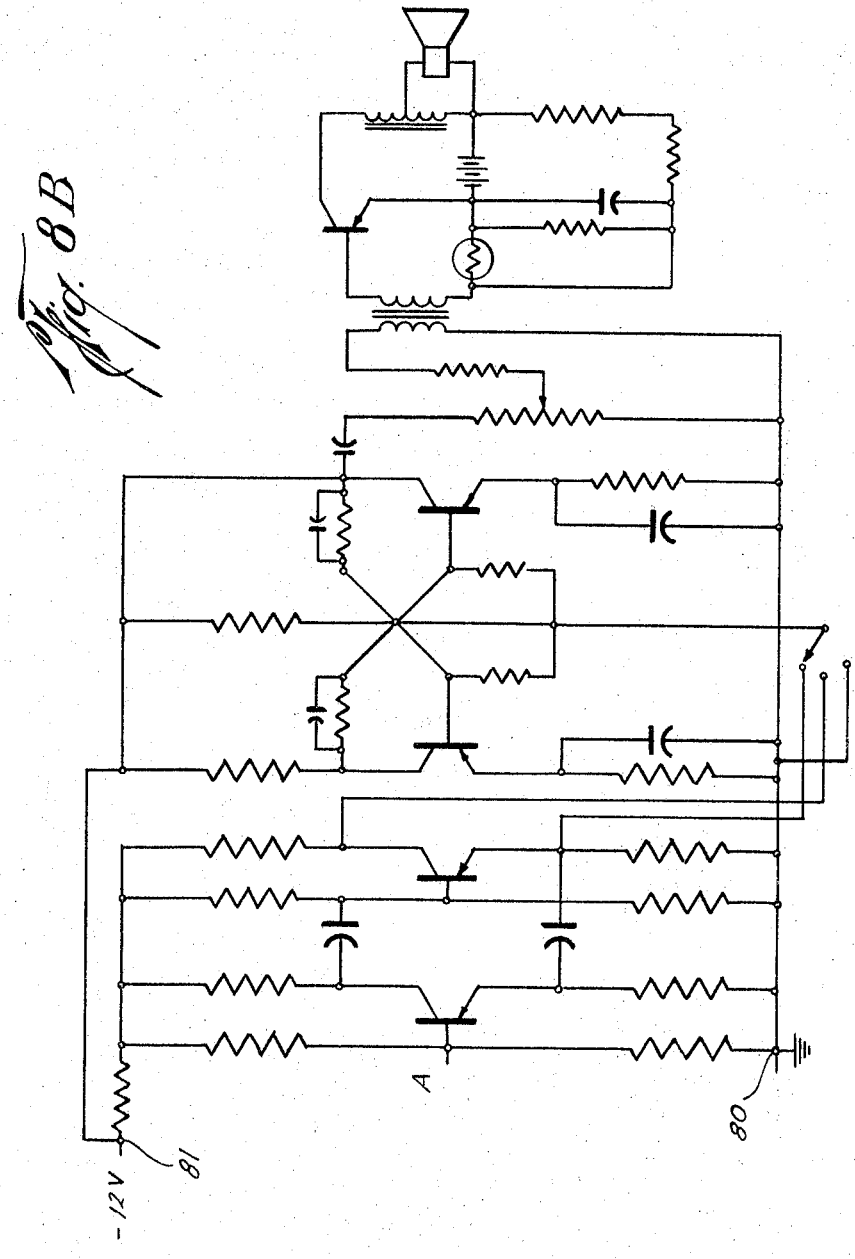

United States Patent Office 3,309,524
Patented Mar. 14, 1967

3,309,524
HYDROGEN DETECTOR USING HYDROGEN PERMEABLE MEMBRANE WITH FEEDBACKS
Clark D. Goodman, Houston, Tex., assignor to Prengle, Dukler & Crump, Inc., Houston, Tex., a corporation of Texas
Filed Mar. 18, 1963, Ser. No. 265,651
13 Claims. (Cl. 250—218)

This application pertains to a new and improved system and method for determining and measuring the presence of and quantity of hydrogen gas. The hydrogen analyzed may be admixed with other gases such as air, oxygen, nitrogen, carbon dioxide, methyl alcohol, methylene chloride, trichlorethylene, hydrogen peroxide, hydrazine, or methylated hydrazines.

Basically, this invention directs hydrogen-containing gas into a detector tube, causes the gas to be ionized, separates the frequencies of the light emitted by gases other than hydrogen from those of hydrogen, and by means of circuitry translates the intensity of the emitted light frequencies attributable to hydrogen into electrical energy capable of operating a meter, said meter thereby indicating the relative amount of hydrogen present.

Prior methods of making quantitative determinations of and detection of the presence of hydrogen gas have involved passing hydrogen through a permeable membrane then performing measurements involving the laws of partial pressures to give a quantitative reading. Another previously utilized method has been to permit hydrogen to pass through a permeable membrane then utilizing the increased electrical conductivity of an associated substance, caused by the presence of hydrogen, to operate certain switch mechanisms. Some devices have, after study involving the capillary dimensions of a Geisler tube, suggested means of enhancing in the spectral intensity of light emitted by specific gases in such a tube. Such devices have passed a gaseous mixture through the modified Geisler tube, caused emission by ionization and allowed the filtered emitted light to operate a photocell. The present invention is designed to improve upon the prior art by discriminating in favor of a gas, such as hydrogen, present in a gaseous mixture, utilizing the spectral response caused by gaseous ionization to lower the resistance in a photo resistive device, by electronic circuitry cause said lowered resistance to provide a quantitative measure of the hydrogen gas studied present in the above mentioned gaseous mixture, and remove the hydrogen ionized from the examining tube my means of a getter.

A prime object of this invention is to provide a means for determining the concentration of hydrogen present in gaseous mixtures.

A further object is the utilization of frequency analysis in determining concentrations of hydrogen gas present in a gaseous mixture.

Another object is to provide a device capable of analyzing hydrogen gas in a quantitative manner, said device being compact, portable, accurate, capable of operating from internal power sources or external, and of giving audible or visual alarm on concentration reaching specific levels.

While only a few objects of the invention have been presented, still others will become obvious in the light of the following description, claims and drawings, in which—

FIGURE 1 is a perspective of the carrying case showing the placement of the meter indicator and various control devices.

FIGURE 2 is a front view of the carrying case showing the lid to be closed and the relative location of the component parts, and FIGURE 3 is a side view of the same showing the location of the blower.

Figure 6A:
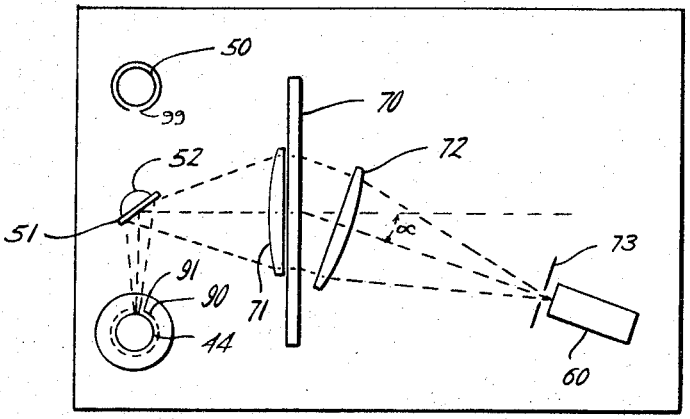
Figure 6B:
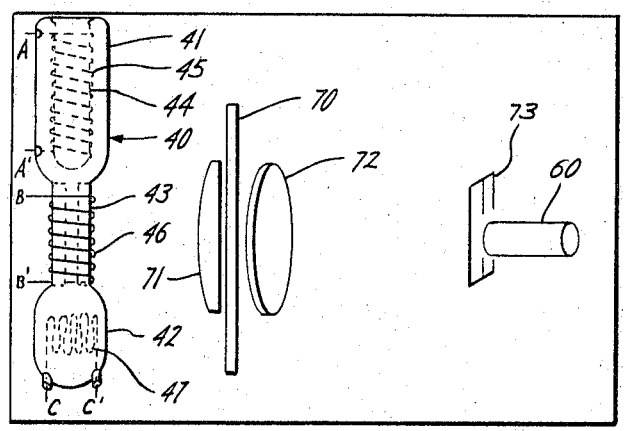
Figure 6C:
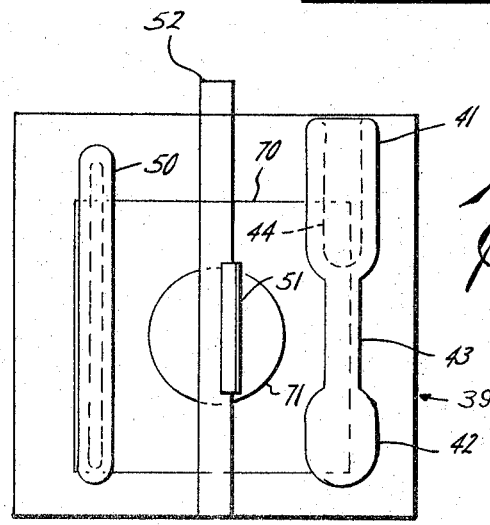

FIGURES 6A, 6B, and 6C are front, top and end views, respectively, of the detector-analyzer apparatus.

Figure 7:
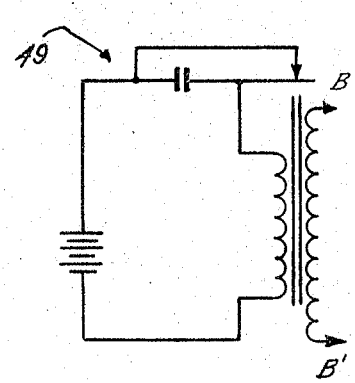

FIGURE 7 is a schematic of the high voltage section of the device, while

Figure 8A:
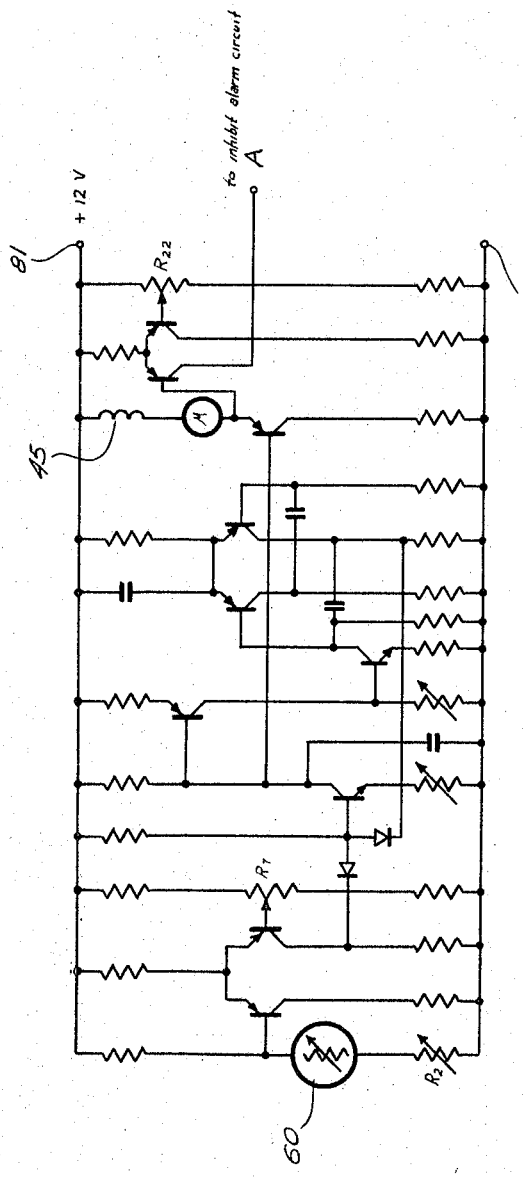

FIGURE 8A is a schematic of the detector-analyzer circuit, while

FIGURE 8B is a schematic of the alarm circuit.

FIGURE 1 shows the hydrogen detector housed within a case 20, having a body 21 and liftable lid 22 thereon. The upper face of the body comprises an instrument and control display 23. Said display includes a meter as well as a plurality of adjustment knobs, levers and indicators some of which may assume different positions. Strap brackets 26 and 27 may be placed on the ends of body 21 and a strap 28 may connect said brackets for carrying the entire device. A foldable handle not shown may be further provided on the top of lid 22 as an additional transportation means. FIGURE 1 shows the placement on one end of member 21 of an audio speaker 30 utilized in the alarm system of the device, while FIGURE 3 shows a blower 31 to be similarly located on the other end of the body. The blower is mounted adjacent port 32, said port being screened by grid 33. This grid effectively keeps foreign particles from entering the blower. Flexible probe 34 removably attached to lid 22 may be connected to port 32 in any convenient manner so as to enable the user to examine areas removed from the precise location of the body of the detecting device.

Turning now to FIGURES 6A, 6B and 6C, the structure and the operation of detector member 39 will be delineated. Detector tube, generally illustrated at 40, includes top and bottom 41 and 42, respectively, connected by a reduced portion or capillary 43. The top 41 of detector tube 40 includes a thimble, forming a membrane 44, around which is wound heater coil 45. The ends of coil 45 may exit top 41 in any appropriate manner as at A and A'. A second coil 46 is shown to be associated with capillary 43, this latter coil being the high voltage spark coil. The electrical circuitry 49 for the high voltage coil is shown generally in FIGURE 7. Finally, a third coil or getter 47 is shown to extend within the confines of bottom 42 of detector tube 40. This final coil will exit from bottom 42 as at C and C'.

Opposite from detector tube 40 is placed a system test capillary tube 50. A coil, not shown, would be associated with tube 50 in the same manner as coil 46 is with the capillary portion of detector tube 40. The system test tube 50 is closed at both ends.

Figure 4:
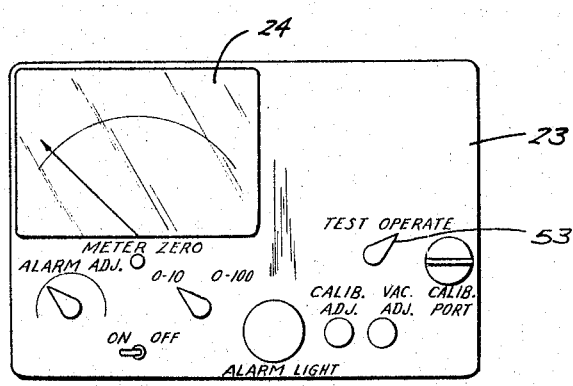
FIGURE 4 is a top view of the instrument panel.
Figure 5:
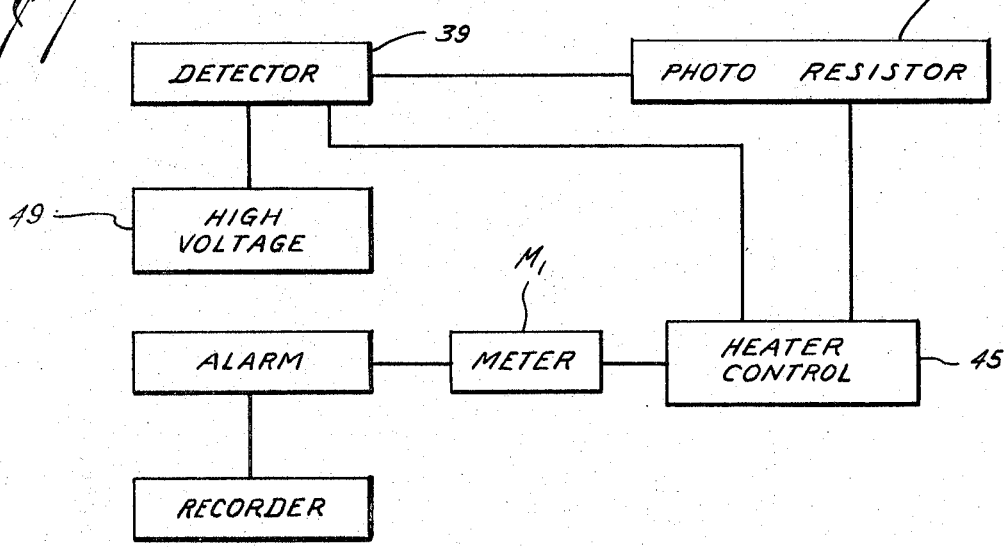
FIGURE 5 is a block diagram of certain component parts of the detector-analyzer apparatus.

Intermediate the two above described tubes is a pivotal mirror comprising a mirror surface 51 attached to shaft 52, said shaft having a manually operable portion or knob 53 attached thereto and disposed on control display 23 (see FIGURE 4). By moving knob 53 from the "operate" position of FIGURE 4 to the "test" position, shaft 52 and its associated mirror will pivot so as to allow mirror surface 51 to face test tube 50 in the same manner that FIGURE 6A shows mirror surface 51 to be facing detector tube 40.

Opposite from the tube end of detector member 39 is disposed a light sensitive device or photoresistive cell 60. This cell has a very high resistance in the absence of light falling on its light sensitive surface. In the area between the tube side of detector member 39 and the photo resistive cell side thereof appears the following structure: an optical grating 70 approximately centered between a first plano convex lens 71 and a second plano convex lens 72. FIGURE 6B shows the photo resistive cell 60 and lens 72 to be mounted at an angle alpha ($\alpha$) off the center axis of grating 70. Closely adjacent the light sensitive portion of cell 60 is a slit system 73.

In the operation of the hydrogen detector, samples of gas will be brought into the detector by blower 31 through port 32 and grid or screen 33. Of course if an external sample supplier is available, then use of the blower may be eliminated. The sample is directed into the top of detector tube 40 by a deflector plate (not shown). On reaching the top of detector tube 40, the gas will pass within the area delineated by recessed portion or thimble 44 and intimately contact the sides of said thimble. The thimble is constructed of a material, such as palladium-silver, which will permit only hydrogen to pass through it. Thus the thimble 44 is a selective membrane. Since the amount of hydrogen passed by thimble 44 is a function of the temperature, heater coil 45 exercises a control over passage of hydrogen. Once an amount of hydrogen passes through the thimble, it enters capillary portion 43, surrounded by spark coil 46. At this point, the hydrogen gas and other residual gases present are ionized by the high voltage spark coil, electrical circuitry for which is shown in FIGURE 7. After being ionized, the hydrogen passes to the lower portion of tube 40 where it is absorbed by coil or getter 47. This getter may be of a material such as titanium or zirconium known for its ability to absorb hydrogen. The coil 47 is heated to its proper operating temperature through leads C–C' from an external power source (not shown). Since tube 40 is initially evacuated so as to provide a partial vacuum inside the tube and a pressure gradient across membrane 44, getter 47, by its pumping action maintains the partial vacuum and pressure gradient and insures that only the hydrogen entering tube 40 through membrane 44 will be evacuated.

When the gas in tube 40, both hydrogen passing through membrane 44 and residual gas remaining after evacuation, is ionized by spark coil 46, phenomena well described in the literature occur. The light emitted by the ionized gases in tube 40 will be composed of numerous frequency groups, each group being characteristic of a particular gas. A cylinder 90 is shown by FIGURE 6A to be placed about detector tube 40 (not shown in FIGURES 6B and 6C). This cylinder has a slit 91 cut in it parallel to the axis of tube 40. This cylinder and slit hereinafter is called the slit system. The slit is on the order of .1 mm. in width. Light coming from tube 40, passes through the slit system onto the surface of mirror 51 from which it is angularly deflected toward lens 71. Plano-convex lens 71 changes light falling on it from having diverging rays to having parallel light rays as they strike optical grating 70. By means well described in the literature, the light will be broken, by grating 70, into its constituent spectral lines. The light is then focused, by a second plano convex lens 72, onto a second slit 73, and therethrough onto light sensitive device 60. It is noted that device 60 is mounted at an angle alpha ($\alpha$) with the center axis of grating 70. The most prominent first order lines of hydrogen appear at angle alpha ($\alpha$). Slit 73 is of such a width that the four most prominent hydrogen spectral lines are transmitted and adjacent lines are excluded. The spectral lines passed are those having wave lengths of 6935.8, 6940.4, 6962.6 and 7072.0 angstroms. Thus the intensity of light striking device 60 is directly proportional tot he quantity of hydrogen present in detector tube 40.

The nature of device or photo resistive cell 60 is such that with increased amounts of light striking its sensitive surface, the electrical resistance of the device decreases. Therefore, as increased amounts of hydrogen enter tube 40, are ionized, and the light frequency groups therefrom strike cell 60, the resistance of cell 60 is decreased.

FIGURES 8A and 8B show the electrical connections to photo resistive cell 60 (see left portion of FIGURE 8A) and heater coil 45. An external battery would be connected to the circuit as at 80 and 81. This source might be the battery 82 of FIGURES 2 and 3 or an external one. The circuit composed of cell 60, and associated parts shown in FIGURE 8A. On initial utilization of the detector, no hydrogen is ionized and therefore little or no light falls on cell 60. Thus, by virtue of the nature of member 60, its resistance is very high. Thus current will flow through heater coil 45 in its route from the connection at 80 to that at 81. Therefore in the beginning of the detection operation the current through heater coil 45 will be at a maximum. This action will cause said coil to increase the temperature of membrane 44 thereby facilitating hydrogen present in the area to pass through said membrane.

The method whereby the circuit of FIGURE 8A controls the temperature is as follows:

Resistor $R_7$ is set at some value to define an equilibrium point and to give the hydrogen detector a range of zero to 1% $H_2$, zero to 10% $H_2$, or zero to 100% $H_2$. The setting of $R_7$, therefore, sets a reference point at which the detector tube operates. This reference point is equated to a given light output from the detector tube 40. As the light output of 40 increases due to an increase in $H_2$ entering, the resistance of cell 60 decreases. The associated circuit, FIGURE 8A lowers the current in coil 45 thereby reducing the temperature of membrane 44. If the iniital startup temperature is $T_1$, and the equilibrium temperature is $T_2$, for a given hydrogen concentration in the sample being measured, then the circuit will change the temperature from $T_1$, to $T_2$, and hold it at $T_2$. If the hydrogen concentration should increase in the sample, the light output will increase. The resistance of cell 60 will go down, moving away from the equilibrium point. The circuit will adjust the current in coil 45 downward changing the membrane 44 to some new lower temperature $T_3$. This will cut back the amount of hydrogen entering the detector 40, and the light output will return to the equilibrium value. Although cell 60 will now return to its equilibrium resistance, the circuit will hold the temperature at $T_3$. The inverse of this procedure applies if the hydrogen concentration drops, wherein the temperature will be readjusted from $T_2$ to some higher value $T_4$.

FIGURE 8A further shows meter M to be in series with heater coil 45. As the current in 45 changes to produce membrane temperatures of $T_2$, $T_3$ or $T_4$ etc., this change is shown on $M_1$, and can be read from the meter face in percent hydrogen in the sample being examined. The scale of meter $M_1$, is so printed as to indicate 0% hydrogen for maximum current through the meter. At the time when substantially no current passes through coil 45, the meter will indicate 100% hydrogen, or its maximum calibrated percent. Thus the current through coil 45 is inversely proportional to the hydrogen present in tube 40.

The output marked, "to inhibit alarm circuit," FIGURE 8A is connected to point A, FIGURE 8B. The circuit of FIGURE 8B is a standard alarm circuit which is set by resistor $R_{22}$ of FIGURE 8A, to give an alarm when the hydrogen concentration reaches a predetermined level. Resistor $R_{22}$ could be set to give an alarm just before an explosive hydrogen concentration occurs or alternatively could be set well below the level at which an explosive mixture would occur in order to give ample warning.

While the circuit defined by FIGURE 8A performs the function of this device, any satisfactory electronic connections between cell 60 and heater coil 45 that would electrically activate coil 45 in inverse proportion to the electrical current passing through cell 60 would be sufficient.

As previously noted a systems test tube 50 is provided (see FIGURE 6C). This tube is closed at both ends and contains an arbitrary quantity of hydrogen. By moving knob 53 to the test position, mirror 51 is rotated 90° counterclockwise, the gas in test tube 50 is ionized in the same manner as the gas in detector tube 40 by a coil (not shown) similar to coil 46, said coil for tube 50 being connected either to the power source of FIGURE 7 or a similar one. On rotation of knob 53, mirror 51 will reflect light being emitted from test tube 50, through slit 99, similar to slit 91 associated with detector tube 40, and thence through the exact same route as light emitting from tube 40 when the detector system is operating. During the test, light falling on cell 60 would tend to decrease current through meter M thereby indicating on the face of the meter an arbitrary calibration resulting from ionization of the hydrogen present within test tube 50. The reading of M can be adjusted by means of adjustable resistor $R_2$. Control for resistance $R_2$ appears on the face of body 23 (see FIGURE 4) and is labeled "Calib. Adj." On completion of the test, knob 53, being spring loaded will automatically return to the "operate" position thereby returning mirror 51 to the position shown in FIGURE 6A.

Calibrator 100 (see FIGURE 1) includes a cylinder 101 containing hydrogen with a tip 102 of similar composition as membrane 44. Tip 102 fits snugly within thimble 44 and intimately contacts same. The temperature of tip 102 and membrane 44 will reach equilibrium values such that members 44 and 102 will pass the same amount of hydrogen. The electrical circuit will function exactly as earlier described. Since only hydrogen is present in calibrator 100 the meter should read 100% hydrogen.

The remainder of the circuit, that of FIGURE 8B, is an alarm system which can be activated on the concentration of hydrogen reaching a predetermined percent. The desired activation percentage may be changed by adjusting resistance $R_{22}$.

Obviously, meter M may be so adjusted to read 0–100 percent hydrogen or any portion thereof such as 0–1, or 0–10 percent, the highest percent reading being given when current through coil 45 is at a minimum.

Although only one preferred embodiment of this invention has been presented, other modifications will appear obvious to one skilled in the art and what is desired to be protected by Letters Patent is best described by the appended claims.

I claim:
1. A hydrogen detector comprising:
   tube means having a capillary portion for causing a gas being analyzed to be ionized,
   means selectively passing hydrogen into said tube means wherein said hydrogen can be acted on by said ionizing means said hydrogen passing means including a hydrogen permeable membrane formed in one end of said tube means, and
   light-sensitive means for controlling the temperature of said hydrogen passing means, said light-sensitive means being activated by the spectral emission of gas ionized by said ionizing means, said temperature being inversely proportional to the amount of spectrally emitted light striking said light-sensitive means.
2. In a gas detector, the combination of:
   means for ionizing gas present in a sample to be analyzed,
   means for selectively providing said sample to said ionizing means said providing means including a portion of said ionizing means made selectively permeable to a specific gas, and
   means regulating the amount of a specific gas provided for ionization by said ionizing means, said regulating means having its regulating function dependent upon the intensity of the spectral intensity of light emitted by said ionized specific gas.
3. In a hydrogen detector, the combination of
   a means for supplying a quantity of gas to a detector tube,
   a detector tube,
   hydrogen permeable membrane means selectively passing hydrogen into said detector tube,
   means for ionizing said hydrogen that is selectively passed,
   means, sensitive to light, regulating the quantity of hydrogen passed by said membrane, and optical means intermediate said tube and said regulating means, for limiting passage of light emitted to that light having a hydrogen frequency group.
4. The combination of claim 3 wherein said hydrogen permeable membrane means is constructed of palladium-silver.
5. The combination of claim 4 wherein:
   said membrane is surrounded by a coil for heating said membrane,
   said regulating means includes a photo resistive cell electrically connected to said coil, the electrical circuitry between said photo resistive cell and said coil including means for changing the temperature of said membrane means inversely proportional to the amount of light striking said regulating means.
6. In a device for measuring hydrogen in a gaseous mixture, the combination of:
   membrane means selectively passing hydrogen while barring passage of other gases contained in a gaseous mixture into a first discharge device,
   means causing spectral emission of said hydrogen in said discharge device,
   optical means for selectively transmitting said spectral emission, and
   electrical means for regulating the temperature of said membrane and thereby the amount of hydrogen passed by said membrane and for determining the percentage of hydrogen contained within said gaseous mixture.
7. The combination of claim 6 wherein:
   said discharge device includes a tube enlarged at both ends and a capillary between said enlarged portions,
   said membrane being formed in one of said enlarged portions, and
   a heater coil associated with said membrane portion.
8. The combination of claim 6 wherein:
   said discharge device includes a tube enlarged at both ends and a capillary between said enlarged ends, said membrane, permeable to hydrogen, formed in one of said ends, a heater coil associated with said membrane, and means for evacuating hydrogen associated with the other of said ends.
9. The combination of claim 8 wherein:
   said electrical means include a light sensitive device adapted, on receiving said selectively transmitted spectral emission, to control the temperature of said heater coil by limiting current therethrough and to control current through a meter associated with said coil.
10. The device of claim 6 including in addition:
    a second discharge device comprising a closed tube having a known percentage hydrogen content,
    a means causing spectral emission of the gas contained within said second tube,
    a controlled means for alternatively transmitting the spectral emission of said first discharge device or of said second discharge device through said optical means.
11. A device for analyzing the hydrogen content of a gaseous mixture comprising:
    permeable membrane means for selectively passing hydrogen contained in said mixture into a first discharge tube,
    first and second discharge tubes,
    first electrical means for causing spectral emission of the gas contained in said first tube,
    coil means associated with said membrane for regulating the heat of said membrane thereby regulating the passage of hydrogen through said membrane, said membrane comprising an inverted thimble shaped portion of said first tube, optical means for restricting the passage of portions of the spectral emission, further electrical means for evacuating hydrogen from said first tube, means permitting said unrestricted spectral emission to, in turn, cause regulation of the temperature of said membrane and measurement of the hydrogen content of said mixture, and rotatable means permitting selective passage of said unrestricted spectral emission from said first or said second tube through said optical means.

12. The combination of claim 11 wherein the portion of spectral emission not restricted is limited to that portion of the spectrum having wave lengths of 6935.8, 6940.4, 6962.6 and 7072.0 angstroms.

13. The combination of claim 11 including a test device containing pure hydrogen and having a conformation complementary to said thimble portion whereby hydrogen passes out of said test device at the same rate as hydrogen passes into said first tube.

References Cited by the Examiner

UNITED STATES PATENTS

| | | | |
|---|---|---|---|
| 2,617,940 | 11/1952 | Giguere | 250—218 X |
| 2,708,387 | 5/1955 | Broida et al. | 88—14 |
| 2,755,388 | 7/1956 | Weisz | 250—218 X |
| 2,876,364 | 3/1959 | Goody | 250—218 X |
| 2,967,451 | 1/1961 | Farrell | 88—14 |
| 3,205,745 | 3/1962 | Liston | 88—14 |

References Cited by the Applicant

UNITED STATES PATENTS

| | | |
|---|---|---|
| 2,400,940 | 5/1946 | McCollum. |
| 2,561,414 | 7/1951 | Potts. |
| 2,571,336 | 3/1954 | Hulsberg. |
| 2,671,337 | 3/1954 | Hulsberg. |

RALPH G. NILSON, *Primary Examiner.*

M. ABRAMSON, E. S. STRICKLAND,
*Assistant Examiners.*